(No Model.)
T. H. SPRINGER.
CENTRIFUGAL SEPARATOR.
No. 547,403. Patented Oct. 1, 1895.
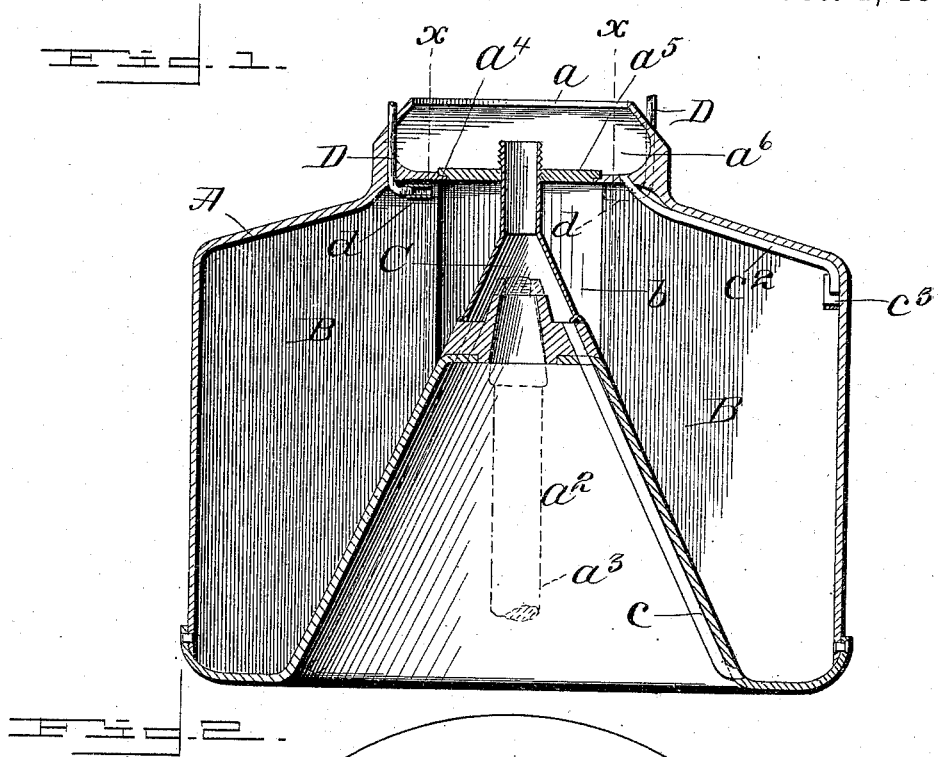
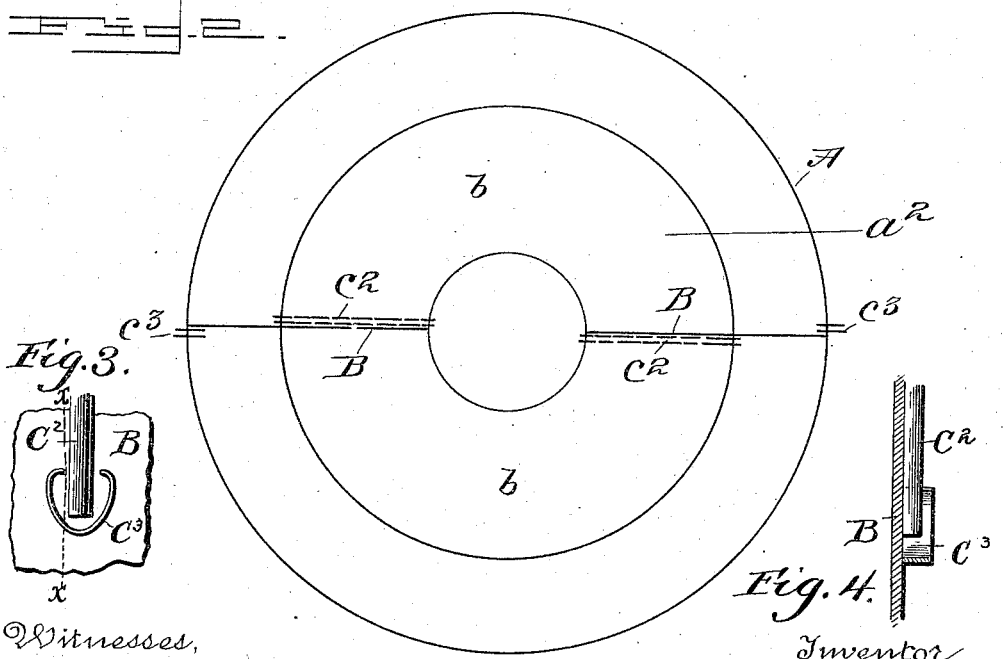
Witnesses,
E. B. Williams
W. H. Pumphrey
Inventor,
Thomas H. Springer
by Geo. H. Holgate
his Attorney.

', element.innerHTML);
UNITED STATES PATENT OFFICE.

THOMAS H. SPRINGER, OF PHILADELPHIA, PENNSYLVANIA, ASSIGNOR, BY DIRECT AND MESNE ASSIGNMENTS, TO THE SPRINGER SEPARATOR COMPANY, LIMITED, OF SAME PLACE.

CENTRIFUGAL SEPARATOR.

SPECIFICATION forming part of Letters Patent No. 547,403, dated October 1, 1895.

Application filed July 10, 1894. Serial No. 517,107. (No model.)

*To all whom it may concern:*

Be it known that I, THOMAS H. SPRINGER, a citizen of the United States, residing at Philadelphia, in the county of Philadelphia and State of Pennsylvania, have invented a new and useful Improvement in Centrifugal Separators, of which the following is a specification.

The invention relates to centrifugal creamers.

The object is to produce a machine by which the separation of cream from milk will be effected in an economical and expeditious manner and the discharge rendered free and unobstructed; further, to greatly increase the capacity, and at the same time obviate all churning and the consequent foaming of the cream, and by which, finally, heavy, light, or medium cream may be drawn through from the bowl through a single outlet in desirable quantities.

The invention consists in the novel details of construction, arrangement, and combination of parts to be hereinafter described and claimed.

The invention is illustrated in the accompanying drawings, forming part of this specification, and in which like letters of reference indicate corresponding parts in the several views.

Figure 1 is a view in central vertical longitudinal section of one embodiment of the invention, showing a bowl having a contracted mouth and an inward-projecting hollow conical bottom, radial blades diametrically disposed dividing the annular space around the cone into two equal chambers, a receiving-chamber at the top or in the upper portion of the cone, one of the inlet-pipes leading from the receiver to the base of a chamber, the inlet-pipe to the opposite chamber being indicated by dotted lines, and fixed and movable outlet or discharge pipes, one of the fixed outlet-pipes leading from the side adjacent the top of the bowl, where it is protected by a scum-deflector, to a collecting-chamber formed at the mouth by the removable cover of the bowl serving as a bottom to the chamber, and the movable outlets being adjustable radially to and from the center and lying immediately under the flanged mouth of the bowl near the blades. Fig. 2 is a view in diagram, the outer circle indicating the bowl proper, the inner circle the top of the cone within the bowl, and the intermediate circle the base of the cone, the diametrically-disposed radii the blades dividing the annular space around the cone into two equal chambers, the parallel lines through the circumference of the inner and intermediate circles on opposite sides of the radii the inlets to the chambers, and the parallel lines through the circumference of the outer circle, and also oppositely disposed, indicating the outlets for the heavy liquid, such as skim-milk. Fig. 3 is a view of a section of a bowl with the deflector in place around the mouth of exit-tube; and Fig. 4 is a sectional view of the same, taken on the line X X of Fig. 3.

In the drawings, A represents a separator-bowl having contracted mouth $a$, and an inward projecting hollow conical bottom $a^2$, designed to receive a driving-spindle $a^3$, upon which it is mounted in the usual manner. The mouth of the bowl is flanged at $a^4$ to receive a cover $a^5$, which when in position forms the bottom of a collecting-chamber $a^6$.

B represents radial blades or wings diametrically disposed to divide the annular space around the cone into two equal chambers $b\,b$, the blades being of a width sufficient to project beyond the cream-line. (Indicated by dotted lines $x\,x$ in Fig. 1.)

C represents a receiving-chamber at the top, upon, or in the upper portion of the cone, into which the liquid, such as milk, is introduced, and by pipes $c$, leading therefrom, is conveyed downward to the base of the chambers of the bowl. At the side, within the bowl, adjacent the top thereof, are outlet-pipes $c^2$ for the heavier portions of the liquid, which would be the skim-milk. These pipes at the lower ends are protected against choking up, as by the accumulation of foreign matter in the form of scum, by deflectors $c^3$ of an approximately U or V shape, the lower end of the pipe lying between the convergent sides of the deflector and the opposite end being extended upward into the collecting-chamber at the mouth of the bowl.

D represents the cream-pipes arranged one in each chamber of the bowl on opposite sides adjacent the blades, with their inner ends lying under the flange at the mouth thereof, at which point they are extensible toward the center by being threaded to receive an engaging nipple or sleeve $d$. By a proper adjustment of the nipples or sleeves upon the end of the cream-pipes light, heavy, or medium cream may be drawn from the bowl, as will be obvious.

Heretofore it has been found necessary to run machines of this class at a greatly-reduced rate of speed to prevent choking up of the outlets, resulting from the centering of scum at such points and large accumulations within the pipes. This objectionable feature is most effectually obviated by the use of the simple and inexpensive deflector above described, its action being to retain the outlet free and clear by preventing a backing up of scum about the end of the pipe, and thus protected the machine may be run at a greatly-increased speed without interruption.

Among other features of importance may be mentioned the form and arrangement of the blades or wings, by which they are extended toward the center of the bowl through the cream-space, the purpose being to give them a proper hold upon the body of the cream, by which it will be carried around with the machine and churning and foaming thereby avoided.

Having described the invention, what I claim as new, and desire to secure by Letters Patent, is—

A separator bowl, having an inward projecting conical bottom, radial blades, diametrically disposed, dividing the space around the cone into equal chambers and extending toward the center, through the cream space, requisite inlets and outlets for milk, and cream pipes, for each chamber radially extensible within the bowl, as specified.

In testimony whereof I have hereunto affixed my signature in the presence of two subscribing witnesses.

THOMAS H. SPRINGER.

Witnesses:
P. E. PIERCE,
W. H. PUMPHREY.